United States Patent Office 3,446,806
Patented May 27, 1969

3,446,806
PROCESS FOR THE PREPARATION OF
1,4-BENZODIAZEPINE 4-OXIDES
Giles A. Archer, Essex Fells, and Leo Henryk Sternbach, Upper Montclair, N.J., assignors to Hoffmann-La Roche Inc., Nutley, N.J., a corporation of New Jersey
No Drawing. Filed Jan. 19, 1966, Ser. No. 521,551
Int. Cl. C07d 99/02, 51/48, 53/06
U.S. Cl. 260—247.5
10 Claims

ABSTRACT OF THE DISCLOSURE

Quaternary ammonium salts of 4-phenylquinazoline 3-oxide which are useful as intermediates in the preparation of pharmacologically active 1,4-benzodiazepines.

This application relates to a novel process for the preparation of known pharmaceutically useful 1,4-benzodiazepine 4-oxides and to novel intermediates useful in the preparation thereof. More particularly, the invention relates to a novel process for the preparation of the known pharmaceutically useful 7-chloro-2-methylamino-5-phenyl-3H-1,4-benzodiazepine 4-oxide and 7-chloro-1,3-dihydro - 5-phenyl-2H - 1,4-benzodiazepine-2-one 4-oxide and analogs thereof. The novel processes of this invention can be traced with respect to the following schematic diagram.

The symbols $R_1$ and $R_2$ in Formulas I, II and III above represent lower alkyl groups which can be the same or different and taken together $R_1$ and $R_2$ represent lower alkylene, aza-lower alkylene, oxa-lower alkylene or thia-lower alkylene such that taken together with the nitrogen atom to which they are attached they form a nitrogen heterocycle containing 3 to 7 ring atoms. When $R_1$ and $R_2$ together represent aza-lower alkylene, oxa-lower alkylene or thia-lower alkylene, the heterocyclic moiety represented by the group

contains an additional hetero atom which can be either nitrogen, oxygen or sulfur; $R_3$ represents hydrogen, halogen, lower alkyl, lower alkoxy, cyano, trifluoromethyl or nitro; $R_4$ and $R_5$ are each independently selected from the group consisting of hydrogen, halogen, lower alkyl, lower alkoxy, cyano, trifluoromethyl and nitro; $R_6$ and $R_7$ are each independently selected from the group consisting of H and lower alkyl; $R_8$ and $R_9$ are each independently selected from the group consisting of H, lower alkyl, lower alkenyl, lower alkynyl or lower cycloalkyl lower alkyl; $R_{10}$ is lower alkyl or aralkyl such as benzyl; X represents the anionic moiety of an acid addition salt preferably a pharmaceutically acceptable acid addition salt; and Y represents OH or the anionic moiety of an acid addition salt.

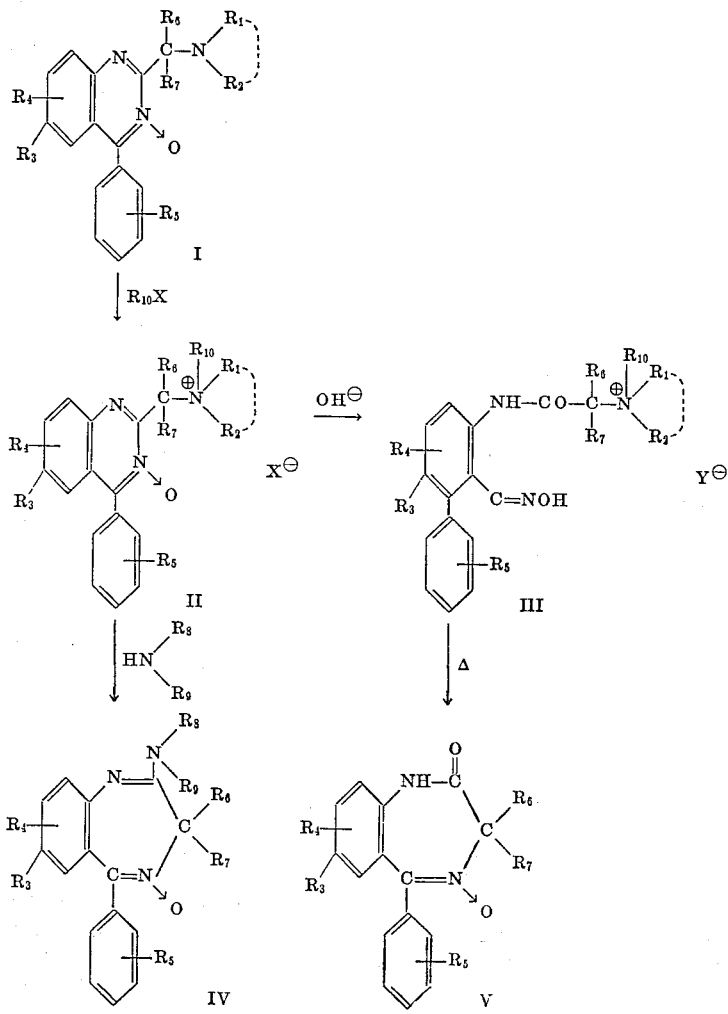

The term "lower alkyl" denotes a straight or branched chain hydrocarbon containing 1 to 7 carbon atoms such as methyl, ethyl, propyl, isopropyl, butyl and the like. The term "lower alkenyl" includes straight or branched chain groups such as allyl, butenyl, isobutenyl and the like. The term "lower alkynyl" includes straight or branched chain groups such as propynyl, butynyl, isobutynyl and the like. The term "alkylene" denotes a straight or branched chain hydrocarbon represented by the formula

wherein the symbols a and b are hydrogen or lower alkyl and can be the same or different and $n$ is an integer from 1 to 6.

The terms "aza-lower alkylene," "oxa-lower alkylene" and "thia-lower alkylene" represent an alkylene chain as defined above which is interrupted by a single nitrogen, oxygen or sulfur atom and can be represented as

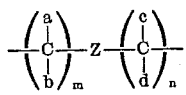

wherein the symbols a, b, c and d represent hydrogen or lower alkyl and can be the same or different; Z is O, S or

wherein R is hydrogen or lower alkyl; and $m$ and $n$ are each an integer from 1 to 4 such that the sum of $m$ and $n$ is not greater than 5.

The term "halogen" comprehends all four halogens, i.e., iodine, bromine, chlorine and fluorine. Chlorine and fluorine are preferred.

According to one process aspect of this application, the compounds of Formula IV above are prepared by the rearrangement of a quaternary ammonium compound of Formula II to a benzodiazepine of Formula IV. The rearrangement is accomplished by treating a Formula II compound with ammonia or a primary amine such as alkylamine, alkenylamine, alkynylamine or cycloalkyl-alkylamine, etc. in the presence of an inert solvent such as water, alkanol, ethers such as tetrahydropyran, dioxane, etc. or, if desired, the reaction can be carried out utilizing the amine reactant as the reaction solvent. The reaction is preferably carried out at about room temperature or slightly above though higher or lower temperatures suitably a temperature in the range of from about —60° to about 150° C. can also be employed.

In another process aspect of this application the compounds of Formula V can be prepared by the intramolecular condensation of a quaternary ammonium compound of Formula III wherein Y represents OH. The intramolecular condensation is suitably accomplished by heating the quaternary ammonium oxime of Formula III. The oximes of Formula III exist in syn and anti configuration and the condensation can be carried out with a mixture of both forms though the anti form is preferred. Only a slight amount of heat is necessary to effect the condensation which is readily carried out at a temperature between about room temperature and about 250° C. Lower or higher temperatures could also be employed.

The quaternary ammonium oxime intermediates of Formula III are accessible via a variety of processes. They can be prepared from the quaternary ammonium quinazolines of Formula II by treatment with base. Any suitable base such as an alkaline or akaline earth base, e.g., sodium hydroxide, potassium hydroxide, barium hydroxide, etc., a quaternary ammonium hydroxide such as trimethylbenzyl ammonium hydroxide and the like can be used. The benzodiazepin-2-one 4-oxides of Formula V are obtained from the quaternary ammonium quinazolines of Formula II by treating the Formula II compound with base and heating with or without isolating the oxime intermediate of Formula III. Alternatively, the oxime intermediates of Formula III can be prepared according to the following reaction.

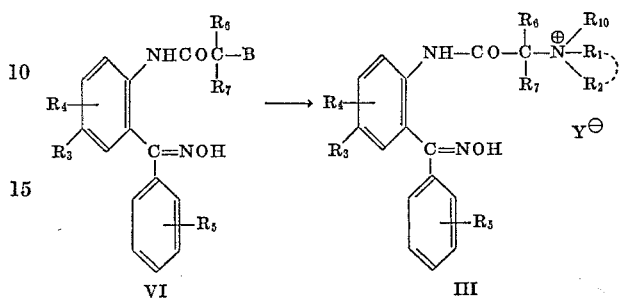

The symbols $R_1$, $R_2$, $R_3$, $R_4$, $R_5$, $R_6$, $R_7$, $R_{10}$ and Y have the same meanings as above; B represents halogen, preferably bromine chlorine and iodine or an amino group of the formula

wherein $R_{11}$ and $R_{12}$ are each independently selected from the group consisting of hydrogen and lower alkyl and they can be the same or different or taken together $R_{11}$ and $R_{12}$ represent lower alkylene, aza-lower alkylene, N-lower alkyl aza-lower alkylene, oxa-lower alkylene or thia-lower alkylene.

When B is halo the compounds of Formula III are prepared by reacting the Formula VI starting material with a tertiary amine of the formula

wherein $R_{10}$, $R_1$ and $R_2$ have the same meanings as hereinabove. When B is an amino group, the compounds of Formula III are obtained by treating the Formula VI starting material with any of the usual alkylating or quaternizing agents as described hereinbefore.

Quaternization of the tertiary amino oximes of Formula VI as well as the tertiary aminoquinazolines of Formula I, respectively, can be accomplished by any of the usual techniques for quaternizing amines, e.g., treatment of the corresponding tertiary amine with any of the ordinary quaternizing agents such as, for example, lower aklylhalide, e.g., methyliodides, methylbromide, methylchloride, ethyliodide, ethylchloride and the like, lower alkylsulfates, e.g., dimethylsulfate, diethylsulfate, lower alkyl-aryl sulfonates, e.g., methyl-p-toluene sulfonate, etc. The quaternization reactions can, if desired, be carried out on secondary or primary amino starting materials by exhaustive alkylation with any of the above alkylating agents. The quaternary ammonium intermediates represented by Formula II and III, respectively, are novel compounds and, therefore, constitute a part of this invention. The anionic moiety of these quaternary ammonium salts can be any of the usual organic or inorganic anions. Thus, for example, it can be the anionic moiety of the quaternizing agent employed in the preparation of the quaternary ammonium salts or it can be the anion of any of the usual acid addition salts obtained by exchanging the anion of the quaternizing agent with an acid addition salt preferably a pharmaceutically acceptable acid addition salt such as salts of the mineral acids, e.g., hydrohalic acids, sulfuric acid, phosphoric acid, p-toluenesulfonic acid, maleic acid, tartaric acid and the like.

The tertiary amino-quinazolines of Formula I and the tertiary amino oximes of Formula VI employed as starting materials in the processes of this invention are a known class of compounds readily prepared by procedures described in the art. The following tertiary quinazolines exemplify the starting materials suitable for use in the processes of this invention:

2-dimethylaminomethyl-4-phenylquinazoline 3-oxide
2-hexamethyleniminomethyl-4-phenylquinazoline 3-oxide
2-morpholinomethyl-4-phenylquinazoline 3-oxide
6-chloro-2-dimethylaminomethyl-4-phenylquinazoline 3-oxide
6-chloro-2-pyrrolidinomethyl-4-phenylquinazoline 3-oxide
6-chloro-4-phenyl-2-piperidinomethylquinazoline 3-oxide
6-chloro-2-ethyleniminomethyl-4-phenylquinazoline 3-oxide
6-chloro-2-morpholinomethyl-4-phenylquinazoline 3-oxide
6-chloro-2-[(hexahydroazepin-1-yl)methyl]-4-phenyl-quinazoline 3-oxide
6-chloro-2-dimethylaminomethyl-4-phenylquinazoline 3-oxide
6-trifluoromethyl-2-dimethylaminomethyl-4-phenyl-quinazoline 3-oxide
6-chloro-2-dimethylaminomethyl-4-(o-chlorophenyl)-quinazoline 3-oxide
6-chloro-2-dimethylaminomethyl-4-(o-fluorophenyl) quinazoline 3-oxide
6-methyl-4-phenyl-2-piperidinomethylquinazoline 3-oxide
6-chloro-4-phenyl-2-piperazinomethylquinazoline 3-oxide
6-chloro-4-phenyl-2-N-methylpiperazinomethylquinazoline 3-oxide and the like.

The quaternary ammonium compounds of Formulas II and III which, as stated above, are useful intermediates in the preparation of compounds of Formulas IV and V also possess useful cardioactive or anti-bacterial properties.

A better understanding of this invention can be had with respect to the examples which follow.

EXAMPLE 1

Preparation of (6-chloro-4-phenyl-2-quinazolinylmethyl) trimethylammonium iodide 3-oxide A solution of 6-chloro-2-dimethylaminomethyl-4-phenylquinazoline 3-oxide (5.0 gm., 15.9 mmoles) in methanol (50 ml.) was treated at room temperature with methyl iodide (5.0 ml., 11.35 gm., 80 mmoles). The product soon crystallized and was collected after cooling in an ice bath, giving (6-chloro-4-phenyl-2-quinazolinylmethyl)trimethylammonium iodide 3-oxide as yellow prisms, M.P. 199–201° (dec.). Further recrystallizations from methanol raised the melting point to 201–203° (dec.).

EXAMPLE 2

Preparation of 7-chloro-2-methylamino-5-phenyl-3H-1,4-benzodiazepine 4-oxide (6-chloro-4-phenyl-2-quinazolinylmethyl)trimethylammonium iodide 3-oxide (1 gm., 2.19 mmoles) was allowed to react with liquid monomethylamine (ca. 20 ml.) in a sealed tube for 19 days at 25–28° C., after which the tube was opened and the excess methylamine allowed to evaporate. The residue was extracted with hot methanol (15 ml.), the solution was filtered and evaporated in vacuo and the resulting residue was partitioned between ice cold dilute hydrochloric acid and ether. The aqueous acid layer was carefully made basic with dilute sodium hydroxide solution and the precipitated 7-chloro-2-methylamino-5-phenyl-3H-1,4-benzodiazepine 4-oxide was recovered by extraction with methylene chloride to give an orange yellow crystalline residue. Trituration with acetone gave 7-chloro-2-methylamino-5-phenyl-3H-1,4-benzodiazepine 4-oxide as pale yellow plates, M.P. 236–238° C.

The same reaction was also carried out at −5 to −10° C. for 6 hr.

EXAMPLE 3

Preparation of 2'-benzoyl-4'-chloro-2-dimethylamino-acetanilide anti-oxime

To a solution of 6-chloro-2-dimethylaminomethyl-4-phenylquinazoline 3-oxide (15.69 gm., 50 mmoles) in methanol (250 ml.) at room temperature was added N-sodium hydroxide (100 ml., 100 mmoles) and the mixture was stirred for 17 hr. To the resulting suspension, containing a colorless precipitate, was added excess solid carbon dioxide and the mixture was concentrated at 25° C. in vacuo and diluted with water. The precipitated product was filtered off and washed with water. Recrystallizations from methanol gave 2'-benzoyl-4'-chloro-2-dimethylaminoacetanilide anti-oxime as colorless prisms, M.P. 190–192° C.

EXAMPLE 4

Preparation of 2'-benzoyl-4'-chloro-2-iodoacetanilide anti-oxime

A solution of 29.6 g. (91.6 mmoles) of 2'-benzoyl-2,4'-dichloroacetanilide anti-oxime and 15.3 g. (102 mmoles) of sodium iodide in 620 ml. of acetone was stirred and heated to reflux for 30 min. After cooling, water was added until all of the precipitated salt had dissolved. On further addition of water the solution became turbid and 2'-benzoyl-4'-chloro-2-iodoacetanilide anti-oxime crystallized. Following filtration and recrystallization from a mixture of methylene chloride and hexane, the product was obtained, melting at 130–131° C. (dec.).

EXAMPLE 5

Preparation of 2'-benzoyl-4'-chloro-2-dimethylaminoacetanilide methyl iodide anti-oxime (A) From (6 - chloro-4-phenyl-2-quinazolinylmethyl) trimethylammonium iodide 3-oxide.—(6-chloro-4-phenyl-2-quinazolinylmethyl)trimethylammonium iodide 3-oxide (2 gm., 4.38 mmoles) was added portionwise to a mixture of N-sodium hydroxide solution (13.1 ml., 13.1 mmoles) and water (27 ml.) during 1 hr. at room temperature. The solution was stirred for 17 hr. and was then acidified (pH 5–6) with dilute hydroiodic acid. The resulting crystalline precipitate was filtered off and recrystallized from methylene chloride-hexane to give 2'-benzoyl-4'-chloro-2-dimethylaminoacetanilide methyl iodide anti-oxime, M.P. 196–198° C. Further recrylstallizations from methanol afforded colorless needles, M.P. 207–209° (dec.).

(B) From 2'-benzoyl-4'-chloro-2-iodoacetanilide anti-oxime.—A suspension of 2'-benzoyl-4'-chloro-2-iodoacetanilide anti-oxime (2.08 gm., 5 mmoles) in methanol (25 ml.) was added slowly to a stirred solution of dry trimethylamine (2.7 gm., 46 mmoles) in methanol (20 ml.) at room temperature. Stirring was continued for 24 hr., then the solution was evaporated at 25–30° C. in vacuo. Recrystallization of the residue from methanol gave 2'-benzoyl-4'-chloro - 2 - dimethylaminoacetaniether-lide methyl iodide anti-oxime, M.P. 191–195° C. (dec.). Further recrystallizations gave colorless needles, .MP. 210° C. (dec.).

(C) From 2'-benzoyl-4'-chloro-2-dimethylaminoacetanilide anti-oxime.—To a stirred suspension of 2'-benzoyl-4'-chloro-2-dimethylaminoacetanilide anti-oxime (10 gm., 30.1 mmoles) in methanol (100 ml.) was added dropwise at room temperature methyl iodide (6.23 ml., 14.2 gm., 100 mmoles) during 1.5–2 hr. The mixture was stirred for 2 hr., then heated on the steam bath and diluted with methanol until all dissolved. Concentration and addition of ether gave 2'-benzoyl-4'-chloro-2-dimethylaminoacetanilide methyl iodide anti-oxime as pale yellow needles, M.P. 208–210° C. (dec.).

EXAMPLE 6

Preparation of 2′-benzoyl-4′-chloro-2-dimethylaminoacetanilide methyl hydroxide anti-oxime 2′-benzoyl-4′-chloro-2-dimethylaminoacetanilide methyl iodide anti-oxime (10 gm., 21.1 mmoles) dissolved in 80 percent methanol-water (300 ml.) was filtered slowly through a 210 x 19 mm. (diameter) column of Dowex AG 1–X8 (100–200 mesh, hydroxide-form) anion exchange resin which had been previously washed with 80 percent methanol-water. Evaporation of the eluate at <30° C. in vacuo and recrystallization from water gave 2′-benzoyl-4′-chloro-2-dimethylaminoacetanilide methyl hydroxide anti-oxime as cream-colored prisms, M.P. 111–114° C. (dec.).

EXAMPLE 7

Preparation of 7-chloro-1,3-dihydro-5-phenyl-2H-1,4-benzodiazepin-2-one 4-oxide

2′-benzoyl-4′-chloro-2-dimethylaminoacetanilide methyl hydroxide anti-oxime (0.5 gm., 1.37 mmoles) was heated in an open test tube immersed in an oil bath at 120–125° C. for 5 min. The compound melted to a toffee-like consistency and much trimethylamine was evolved. The temperature was then raised to 155° C. during 10 min. until no further amine was evolved. The mixture was cooled and extracted with methylene chloride and water; the basic aqueous layer was acidified with dilute acetic acid (pH 6). The residue obtained on evaporation of the organic extract was extracted with cold dilute sodium hydroxide solution and the extract was acidified (pH 5) with dilute acetic acid. The precipitated 7-chloro-1,3-dihydro-5-phenyl-2H-1,4-benzodiazepin-2-one 4-oxide was recovered by extraction with methylene chloride and obtained as a pale yellow gum. Trituration with acetone gave colorless needles of 7-chloro-1,3-dihydro-5-phenyl-2H-1,4-benzodiazepin-2-one 4-oxide, M.P. 235–238° C.

The product 7 - chloro-1,3-dihydro-5-phenyl-2H-1,4-benzodiazepin-2-one 4-oxide could also be obtained by repetition of the cyclization at 200–205° C. for 4 min. or in tetralin or quinoline solution at 200–210° C. for 2 hr.

EXAMPLE 8

Preparation of 6-chloro-2-[(hexahydroazepin-1-yl)-methyl]-4-phenylquinazoline 3-oxide 6 - chloro-2-chloromethyl-4-phenylquinazoline 3-oxide (30.5 gm., 0.10 mole) was added portionwise to a stirred solution of hexamethylenimine (70 gm., 0.7 mole) in methanol (120 ml.) during 30 min. at room temperature. Stirring was continued for a further 16 hr., then the mixture was concentrated at <30° C. in vacuo, diluted with water and acidified with hydrochloric acid. The solution was extracted with ether to remove non-basic impurities and then the acid aqueous layer was cooled and made basic with dilute sodium hydroxide solution. The crude product precipitated and was recovered by extraction with methylene chloride. Recrystallization from methylene chloride-hexane gave 6-chloro-2-[(hexahydroazepin-1-yl)-methyl]-4-phenylquinazoline 3-oxide, M.P. 98–100° C. Further recrystallizations from ether-petroleum ether afforded yellow needles, M.P. 99–101° C.

EXAMPLE 9

Preparation of 6-chloro-4-phenyl-2-piperidinomethylquinazoline 3-oxide

Reaction of the chloromethylquinazoline, 6 - chloro-2-chloromethyl-4-phenylquinazoline 3-oxide with a solution of piperidine in methanol and isolation of the product in the manner described in Example 8 above gave 6-chloro-4-phenyl-2-piperidinomethylquinazoline 3-oxide. A sample was recrystallized from acetone and obtained as colorless needles. M.P. 151–153° C.

EXAMPLE 10

Preparation of 6-chloro-2-morpholinomethyl-4-phenylquinazoline 3-oxide

Reaction of 6-chloro-2-chloromethyl-4-phenylquinazoline 3-oxide with a solution of morpholine in methanol and isolation of the product in the manner described in Example 8 above gave 6-chloro-2-morpholinomethyl-4-phenylquinazoline 3-oxide. A sample was recrystallized from aqueous methanol and obtained as pale yellow prisms, M.P. 184–185° C.

EXAMPLE 11

Preparation of 6-chloro-2-ethyleniminomethyl-4-phenylquinazoline 3-oxide

6 - chloro-2-chloromethyl-4-phenylquinazoline 3-oxide (5.0 gm., 16.4 mmoles) was added portionwise to a stirred mixture of ethyleneimine (50 ml.) and triethylamine (14 ml.) at 0° C. After 1.5 hr. at 0° C., the precipitated product was recovered by filtration and washed with petroleum ether. Recrystallization from methylene chloride-hexane gave 6-chloro-2-ethyleniminomethyl-4-phenylquinazoline 3-oxide as pale yellow needles, M.P. 169–171° C.

EXAMPLE 12

Preparation of 6-chloro-2-pyrrolidinomethyl-4-phenylquinazoline 3-oxide

6 - chloro-2-chloromethyl-4-phenylquinazoline 3-oxide was reacted with a solution of pyrrolidine in methanol and isolation of the product as described in Example 8 above gave 6-chloro-2-pyrrolidinomethyl-4-phenylquinazoline 3-oxide as pale yellow needles, M.P. 159–161° C. (dec.).

EXAMPLE 13

Preparation of 1 - (6 - chloro-4-phenyl-2-quinazolinylmethyl) - 1 - methylhexahydroazepinium iodide $N_3$-oxide To a stirred solution of 6-chloro-2-[(hexahydroazepin-1-yl) methyl]-4-phenylquinazoline 3-oxide (5.0 gm., 13.55 mmoles) in acetone (100 ml.) was added methyl iodide (4.24 ml., 9.66 gm., 68 mmoles) at room temperature. The product precipitated and was collected and washed with acetone and ether. Recrystallization from methanol-ethanol gave 1-(6-chloro-4-phenyl-2-quinazolinylmethyl)-1-methylhexahydroazepinium iodide $N_3$-oxide, M.P. 208–210° C. (dec.). Further recrystallizations from methanol afforded yellow prisms, M.P. 205–207° C. (dec.).

EXAMPLE 14

Rearrangement of 1 - (6-chloro-4-phenyl-2-quinazolinylmethyl)-1-methylhexahydroazepinium iodide $N_3$-oxide to 7 - chloro - 2-methylamino-5-phenyl-3H-1,4-benzodiazepine 4-oxide 1 - (6-chloro-4-phenyl-2-quinazolinylmethyl)-1-methylhexahydroazepinium iodide $N_3$-oxide (1.0 gm., 1.96 mmoles) was added portionwise to a stirred 12 percent solution of monomethylamine in methanol (20 ml.) at room temperature. The mixture was stirred for a further 69 hr., and was then filtered. The filtrate was evaporated and the resulting residue was extracted with a mixture of dilute hydrochloric acid and ether; the aqueous acid layer was filtered and made basic with dilute sodium hydroxide solution. Extraction with methylene chloride afforded 7 - chloro-2-methylamino-5-phenyl-3H-1,4-benzodiazepine 4-oxide. Trituration with acetone gave pale yellow prisms, M.P. 234–237° C.

EXAMPLE 15

Rearrangement of (6 - chloro-4-phenyl - 2-quinazolinylmethyl) trimethyl - ammonium iodide 3 - oxide with monomethylamine in methanol to give 7-chloro-2-methylamino-5-phenyl-3H-1, 4-benzodiazepine 4-oxide (6-chloro - 4-phenyl - 2-quinazolinylmethyl) trimethylammonium iodide 3-oxide (0.77 gm., 1.69 mmoles) was treated with 12 percent monomethylamine in methanol (25 ml.) and the product isolated in the manner described in Example 14 above giving 7-chloro-2-methylamino-5-phenyl-3H-1,4-benzodiazepine 4-oxide, M.P. 235–237° C.

We claim:

1. A quaternary ammonium salt of the formula

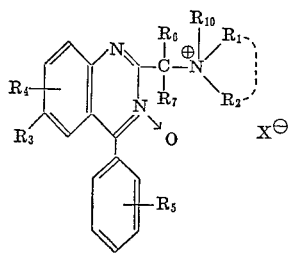

wherein $R_1$ and $R_2$ each represent lower alkyl or taken together they represent lower alkylene, aza-lower alkylene, N-lower alkyl-aza-lower alkylene, oxa-lower alkylene or thia-lower alkylene wherein said second hetero atom is not adjacent the quaternary nitrogen atom; $R_3$ represents hydrogen, halogen, lower alkyl, lower alkoxy, cyano, trifluoromethyl or nitro, $R_4$ and $R_5$ are each independently selected from the group consisting of hydrogen, halogen, lower alkyl, lower alkoxy, cyano, trifluoromethyl and nitro; $R_6$ and $R_7$ are each independently selected from the group consisting of hydrogen and lower alkyl; $R_{10}$ represents lower alkyl or benzyl; and X is selected from the group consisting of the anionic moiety of quaternary ammonium salts and the anionic moiety of an acid addition salt.

2. The compound according to claim 1 wherein $R_4$, $R_5$, $R_6$ and $R_7$ are each hydrogen.

3. The compound according to claim 1 wherein $R_4$, $R_5$, $R_6$ and $R_7$ are each hydrogen and $R_3$ is chloro.

4. The compound of claim 1 wherein $R_4$, $R_5$, $R_6$ and $R_7$ are each hydrogen; $R_3$ is chloro and $R_1$ and $R_2$ taken together are $-(CH_2)_n-$ wherein $n$ is 2 to 6.

5. The compound of claim 4 wherein $n$ is 2.
6. The compound of claim 4 wherein $n$ is 4.
7. The compound of claim 4 wherein $n$ is 5.
8. The compound of claim 4 wherein $n$ is 6.

9. The compound of claim 1 wherein $R_4$, $R_5$, $R_6$ and $R_7$ are each hydrogen; $R_3$ is chloro and $R_1$ and $R_2$ taken together are $-CH_2-CH_2-O-CH_2CH_2-$.

10. The compound according to claim 1 wherein $R_1$, $R_2$ and $R_{10}$ are each methyl; $R_4$, $R_5$, $R_6$ and $R_7$ are each hydrogen; and $R_3$ is chloro.

References Cited

UNITED STATES PATENTS

| | | | |
|---|---|---|---|
| 3,267,110 | 8/1966 | Pachter et al. | 260—256.4 |
| 3,297,698 | 1/1967 | Metlesics et al. | 260—256.4 |

OTHER REFERENCES

Sternbach et al.: J. Org. Chem., vol. 26 (1961), pp. 1111–8.

ALEX MAZEL, *Primary Examiner.*

R. J. GALLAGHER, *Assistant Examiner.*

U.S. Cl. X.R.

260—239, 239.3, 243, 244, 247.1, 147.2, 256.4, 562, 999